(12) United States Patent
Kallamkote et al.

(10) Patent No.: US 11,070,082 B2
(45) Date of Patent: Jul. 20, 2021

(54) SYSTEMS AND METHODS FOR MANAGING MESH-NETWORKED POWER CONTROL DEVICES USING TOKENS

(71) Applicant: CARBONTRACK PTY LTD., Melbourne (AU)

(72) Inventors: Shavaj Kallamkote, Melbourne (AU); Spyridon Livadaras, Melbourne (AU)

(73) Assignee: CARBONTRACK PTY LTD., Victoria (AU)

( * ) Notice: Subject to any disclaimer, the term of this patent is extended or adjusted under 35 U.S.C. 154(b) by 280 days.

(21) Appl. No.: 16/093,928

(22) PCT Filed: Sep. 19, 2016

(86) PCT No.: PCT/AU2016/050874
§ 371 (c)(1),
(2) Date: Oct. 15, 2018

(87) PCT Pub. No.: WO2017/045038
PCT Pub. Date: Mar. 23, 2017

(65) Prior Publication Data
US 2019/0115785 A1   Apr. 18, 2019

(30) Foreign Application Priority Data
Sep. 18, 2015   (AU) ................................ 2015903822

(51) Int. Cl.
*G05B 19/042*   (2006.01)
*H02J 13/00*   (2006.01)
(Continued)

(52) U.S. Cl.
CPC ........ *H02J 13/0075* (2013.01); *G05B 19/042* (2013.01); *H02J 3/14* (2013.01);
(Continued)

(58) Field of Classification Search
CPC ...... H02J 13/0075; H02J 3/14; H02J 2310/14; G05B 19/042; G05B 2219/25022;
(Continued)

(56) References Cited

U.S. PATENT DOCUMENTS 9,791,910 B1* 10/2017 Brown .................... G06F 1/324
2003/0225483 A1* 12/2003 Santinato ................. H02J 3/14
700/295
(Continued)

FOREIGN PATENT DOCUMENTS

WO   WO-2008071995 A2 * 6/2008 ................ H02J 3/00

OTHER PUBLICATIONS

International Search Report, PCTAU2016/050874, dated Jan. 17, 2017.

(Continued)

*Primary Examiner* — Bernard G Lindsay
(74) *Attorney, Agent, or Firm* — Nixon & Vanderhye

(57) ABSTRACT

A power control device for controlling the power supplied to a device connected to it is connected wirelessly by a mesh network to a local controller and provides information on the power usage of the connected device remotely. The power control device can receive a function assignment remotely and will control the connected device according to that function.

8 Claims, 12 Drawing Sheets

(51) Int. Cl.
*H02J 3/14* (2006.01)
*H04L 29/08* (2006.01)
*H04W 84/18* (2009.01)

(52) U.S. Cl.
CPC .. *H04L 67/125* (2013.01); *G05B 2219/25022* (2013.01); *H02J 2310/14* (2020.01); *H04W 84/18* (2013.01); *Y02B 70/3225* (2013.01); *Y04S 20/222* (2013.01)

(58) Field of Classification Search
CPC .. H04L 67/125; H04W 84/18; Y02B 70/3225; Y04S 20/222
See application file for complete search history.

(56) References Cited

U.S. PATENT DOCUMENTS

| | | | |
|---|---|---|---|
| 2003/0233201 A1* | 12/2003 | Horst | H02J 13/00012 700/295 |
| 2004/0063405 A1 | 4/2004 | Song | |
| 2007/0058453 A1* | 3/2007 | Shaffer | G06Q 50/06 365/189.05 |
| 2008/0106146 A1* | 5/2008 | Baek | G01D 4/004 307/35 |
| 2009/0174569 A1 | 7/2009 | Smith et al. | |
| 2010/0004790 A1* | 1/2010 | Harbin, III | G05D 23/1923 700/291 |
| 2012/0197455 A1* | 8/2012 | Lee | H02J 3/008 700/296 |
| 2012/0209442 A1* | 8/2012 | Ree | H04W 52/367 700/295 |
| 2012/0299509 A1* | 11/2012 | Lee | H04L 41/0806 315/291 |
| 2012/0323392 A1 | 12/2012 | Gerdes et al. | |
| 2014/0180487 A1* | 6/2014 | Bull | H04L 12/282 700/295 |
| 2014/0223526 A1* | 8/2014 | Lu | G06Q 20/0652 726/6 |
| 2015/0120074 A1* | 4/2015 | Kako | G06Q 10/06 700/295 |
| 2015/0177711 A1* | 6/2015 | Yuzurihara | H05B 47/105 700/56 |
| 2016/0036227 A1* | 2/2016 | Schultz | H02J 7/34 700/282 |

* cited by examiner

SYSTEMS AND METHODS FOR MANAGING MESH-NETWORKED POWER CONTROL DEVICES USING TOKENS

TECHNICAL FIELD OF THE INVENTION

Embodiments generally relate to power control devices, systems and methods involving mesh networks for control of appliances and/or other systems that use electrical power.

BACKGROUND OF THE INVENTION

This application relates to improvements of systems and methods described in International Patent Application No. PCT/AU2014/000119, filed 13 Feb. 2014, the entire contents of which is hereby incorporated by reference. That application describes systems and methods for monitoring and control of appliances. Such systems and methods may be employed in circumstances where it is desired to improve efficiency of power usage in a domestic or industrial setting, for example.

It is desired to address or ameliorate one or more shortcomings or disadvantages associated with prior arrangements involving the use of power by multiple appliances and/or other systems, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY OF THE INVENTION

Some embodiments relate to a power control device for controlling power in an appliance. The device may control a power usage monitor to monitor power used by the appliance. The device also comprises memory, a wireless transceiver and a processing device having access to the memory and configured to execute program codes stored in the memory. When the at least one processing device executes the program code, the at least one processing device is configured to receive output signals from the power usage monitor, to determine power usage by the appliance based on the output signals and to transmit information about the determined power usage to the external device via the wireless transceiver. In some embodiments, the at least one processing device may be configured to control power to the appliance based on a function type stored in the memory, where the function type is related to a function of the appliance.

In some embodiments, the stored function type may be stored in the memory in response to receiving a device configuration instruction from an external device via the wireless transceiver. In response to the device configuration instruction, the memory may further store a function priority and a task set that includes at least one task associated with the stored function type. Each task of the task set may have a task priority associated therewith. The at least one processing device may be configured to control power to the appliance for performing one of the tasks at least in part based on the task priority for that task. The memory may further store a set of control instructions for each task for execution by the processing device to perform the respective task.

The at least one processor may be configured to transmit a power allocation request to an external master device via the wireless transceiver to allow the appliance to perform a task, where the power allocation request comprises a task identifier. The power allocation request may comprise an estimated power required to complete the task. The at least one processing device may be configured to determine the estimated power based on stored historical information of power required to complete the task and based on at least one relevant task parameter. The at least one relevant task parameter may be specific to the function type. For example, where the task is to heat a space from one temperature to another, higher temperature, a relevant task parameter may be the ambient external temperature, a volume of the space to be heated or whether other heating units are operating to heat the same space, for example. In this example, the function type would be a heating or cooling function, with the task being to achieve a set temperature set point.

The wireless transceiver of the power control device may be configured for a local area network for communication but not cellular network communication. The wireless and transceiver may be configured to transmit and receive communications using a ZigBee protocol, for example. The device may be configured to communicate with other nearby devices according to a mesh network protocol, for example.

Some embodiments relate to an interface device for a localised mesh network. The device comprises a local area wireless transceiver, a cellular data transceiver, memory storing processor-executable program code, and at least one processor having access to the program code and configured to communicate with other devices via the local area wireless transceiver and the cellular data transceiver. The at least one processor can execute the program code in order to receive a plurality of power allocation requests from power control devices forming part of the localised mesh network, determine available power resources and determine which of the power allocation requests to accommodate based on the available resources and responding with an approval message to each of the power allocation requests that are to be accommodated.

Some embodiments relate to a power control network, comprising an interface device configured for local area wireless communication with local devices and cellular data network communication with a remote server; and a plurality of local power control devices each configured to control power to an appliance and to communicate with the interface device; wherein the interface device is configured to transmit configuration instructions to each of the local power control devices to configure the respective local power control device to control power to the appliance based on a function type, wherein the function type is related to a function of the appliance.

Some embodiments relate to, in an interface device having a local area wireless transceiver and a cellular data transceiver, a method comprising: receiving a plurality of power allocation requests via the local area wireless transceiver from a respective plurality of power control devices forming part of the localised mesh network, each of the power allocation requests relating to proposed power usage by an appliance to which a respective power control device is coupled; determining available power resources; determining which of the power allocation requests to accommodate based on the available power resources; and responding to each of the power allocation requests to be accommodated by sending an approval message to the respective power control devices from which the accommodated power allocation requests were received.

Some embodiments relate to a method of power control, comprising:

transmitting via a wireless transceiver to an external device a power allocation request in respect of a task to be performed by an appliance;

receiving an approval message from an external device in response to the power allocation request; and controlling power to the appliance to allow performance of the task.

The method may further comprise determining an estimated power required to complete the task, wherein the transmitted power allocation request comprises the estimated power required to complete the task. The approval message may comprise a resource allocation token. The resource allocation token may comprise data defining a validity period.

Some embodiments relate to a master control unit for a local area network comprising a plurality of satellite units, the master control unit comprising:

a local area wireless transceiver;

at least one processor;

memory accessible to the at least one processor and storing executable program code that, when executed by the at least one processor, causes the master control unit to:

receive at least one energy resource request from a respective one of the satellite units, determine whether to approve the at least one energy resource request based on at least one of: stored operational parameters, a function priority associated with the energy resource request, a function priority of any energy resource requests received from other satellite units, or the availability of surplus energy.

Some embodiments relate to a power control device for controlling power to an appliance, comprising:

a local area wireless transceiver;

at least one processor;

memory accessible to the at least one processor and storing executable program code that, when executed by the at least one processor, causes the power control device to:

determine that the appliance requires power to perform an appliance function, determine whether a valid resource allocation token is stored in the memory to authorise performance of the appliance function, if there is no valid resource allocation token stored in the memory, transmit a resource allocation request to a master control unit via the local area wireless transceiver, and if there is a valid resource allocation token stored in the memory, switching power to the appliance to perform the appliance function.

The power control device may be co-located with the appliance. The power control device may be integrated into the appliance. The power control device may be positioned to communicate with the appliance using light signals, such as infrared light signals.

BRIEF DESCRIPTION OF DRAWINGS

Embodiments are described in further detail below, with reference to the accompanying drawings, in which.

DESCRIPTION OF EMBODIMENTS

Figure 1:
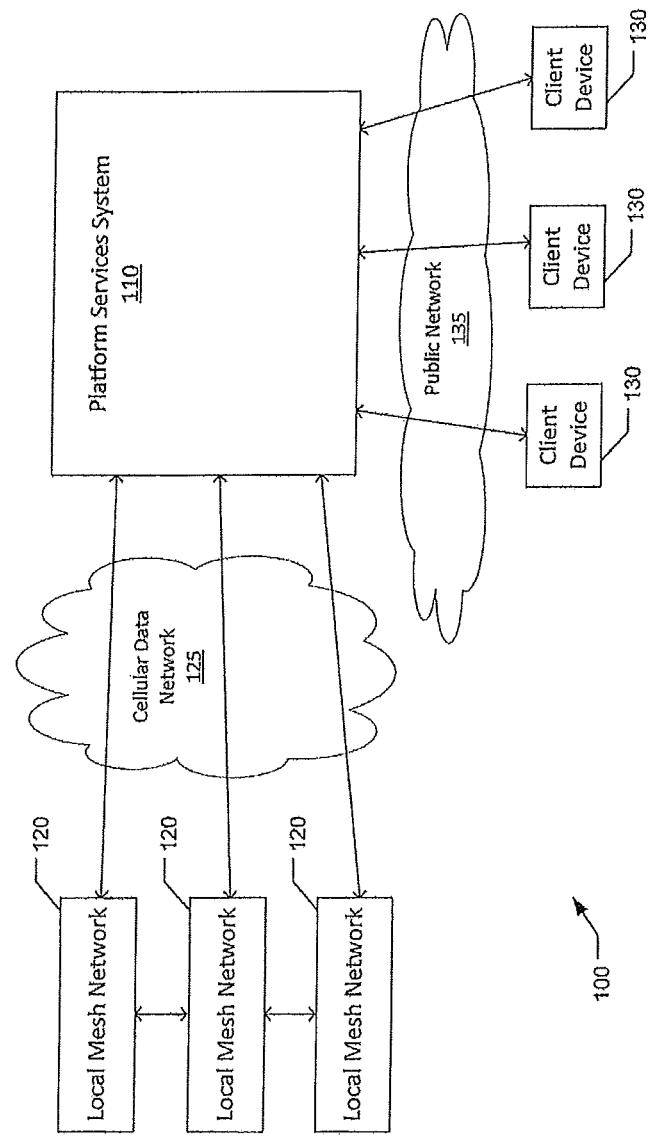
FIG. 1 is an example block diagram of a system according to some embodiments.

Embodiments of some systems and devices are described with reference to FIGS. 1 to 4. Embodiments involve the use of localised mesh networks 120 for connected appliances and control systems, primarily for sharing available energy resources. The mesh networks form part of a larger system 100 for mesh-networked power usage control and monitoring. Each mesh network 120 includes at least one master control unit (MCU) 210 that acts as an interface device for external networks and can include up to more than 64,000 (65535) endpoint devices called satellite units (SUs) 215 that act as power control devices for the appliances or control systems.

Traditionally power/load distribution and management is in the context of power being generated in generating stations and distributed to end consumers. The responsibility of management in this context terminates at a residential or commercial facility. Described embodiments allow the management and distribution of load from this point onwards. Appliances within a household or control systems within a commercial facility can be controlled and managed by satellite units under the direction or supervision of the master control unit.

Each mesh network is configured and controlled by a master control unit that forms part of the network. The primary function of the governor is the formation and maintenance of the mesh network and handling traffic routing in and out of the network.

As the network is formed, for example by the ad hoc addition of appliances having satellite units coupled to them, user preferences and control parameters are downloaded and distributed by the MCU 210 to rest of the network. Preferences and setup parameters are managed by the users via a web application and/or App provided by a platform services system 110.

All major predictive analytics computations are carried out by the platform services system 110. For this purpose and for reporting, usage and behavioural data are periodically collected by the master control unit 210 of each local area mesh networks 120 and posted via a cellular data network 125 to platform services system 110 for analysis and storage.

Collection and distribution of information from and to the SUs 215, such as predictive results, parameter changes, calibration constants and switch status, are part of the responsibility of the master control unit (MCU) 210. The MCU 210 maintains a cache of this information for the local mesh network 120 to which that MCU 210 is dedicated in case of a platform services system failure and/or network connection failures.

The primary mode of communication between the MCU 210 and platform services system 110 is via SMDT (Secure Minimal Data Transfer) over a cellular network 125. The MCU 210 is also capable of communication via Ethernet or routing communications via other media, for example by utilising connectivity from local smart devices.

The MCU 210 is also capable of transporting communications (wrapped in secure data envelopes) from other nearby mesh networks, as described in further detail below, with 35 reference to FIG. 11. The MCU 210 cannot open or access information within the envelope, but it can relay the information on behalf of other mesh networks to and from the platform services system 110.

The MCU 210 is also the controlling body for all (energy) resource negotiations between satellite units 215 within the one localised mesh network 120 in the event of contention. In the event of failure of the MCU 210, a satellite unit (SU) 215 within the mesh network can assume some of the MCU 210 functions and responsibilities (other than cellular network communication).

The combination of the MCU 210 and SUs 215 allow the formation the mesh network 120 for appliance power control and monitoring with predictive power management. This provides the ability to create a power distribution micro-network, which offers customers the ability to accurately measure electricity generated and consumed, to remotely control power to appliances/equipment in the network and to configure the network for efficient operation.

The MCU 210 and SUs 215 record user behaviour, along with load distribution, within a household or business at fixed (configurable) intervals, periodically, for example every 15 minutes, and the platform services system 110 can apply a machine learning algorithm to effectively predict future power demand and make decisions on parameters such as:
  Export power to grid when green power is available;
  Run specific appliances nominated by the user when green power is available;
  Store excess power to battery storage units; and
  When to use power from battery or the grid.

The mesh network 120 components (MCU 210 and SUs 215) are designed to measure 3 phase consumption and, in the case of the MCU 210 also measure local generation of power, for example by a solar cell array or wind or water turbine. The MCU 210 and SUs 215 are preferably encased by a tamper-proof box or housing, with minimal or no interactive features or functions.

The MCU 210 can support over 64,000 satellite units for monitoring and control, although it is more likely that less than 100 SUs 215 will be paired with a single MCU 210 for most domestically used mesh networks 120. MCU 210 is capable of measuring power consumption with Class 1 accuracy. It is also capable of switching and control functions. This gives users and the system 110 control over every appliance/equipment component within a device area network 120. A predictive power management unit (executing on the platform services system 110) works with this mesh network 120 to form a micro-power distribution network.

Power Distribution Micro Network: the mesh network 120 forms a local area ZigBee mesh with the MCU 210 as the controller and satellite units 215 as routers. In addition to a standard ZigBee personal area network ("PAN"), the ZigBee implementation for the MCUs 210 has a layer to allow communications to hop to other PANs in nearby mesh networks 120 in case of MCU 210 communication failure to the platform service system 110 in one network 120. The communication packets when carried via foster PANs are wrapped in an encrypted data envelop during transport for additional security and data tracking. This gives the transmitted data and messages from the satellite units 215 the ability to find their way to the platform services system 110 in case of a MCU cellular transceiver failure.

Measurements: In addition to measuring power usage with Class 0.5 accuracy, MCUs 210 are capable of measuring the following parameters:
  Net solar power exported;
  Net solar power generated;
  Net solar power used; and
  Individual measurements from satellite units 215.

Open API: the platform services system 110 provides an open Representational State Transfer ("REST") based Application Programming Interface (API) 252 which can be used to utilise and extend the functions of the mesh networks 120 and the platform functionality.

Over the air updates: Every device within the mesh network 120 is capable of over-the-air updates. This allows the end point satellite units 215 to be updated and reconfigured based on specific profiles and control functions from an MCU 210 or from the platform services system 110 via the MCU 210.

Lossless compression: All devices within the mesh network 120 are capable to compress and decompress data using a lossless compression algorithm. This enables the MCU 210 and SUs 215 to communicate effectively with fewer data packets and packet losses within device area network 120. The compressed data envelop is then lifted to the server via a Minimum Data Transfer ("MDT") protocol, as described in PCT/AU2014/000119.

Independent control: All devices within the mesh network 120 are capable of performing critical control functions in the event of a MCU 210 failure or communication failure. The control and predictive parameters are cached within the individual SUs 215 on a regular basis for this purpose.

Each SU 215 is an endpoint control system within the mesh network which is capable of performing the following functions:
  Accurate energy measurement of an appliance to which it is coupled;
  Control functions for a wide range of equipment;
  Programmable control (via configuration instructions received from the MCU 210); and
  Network routing.

The SU 215 can be embedded into equipment or appliances or it can be a separately connectable device that provides independent remote control functions. The SU 215 includes a number of programmable hardware peripherals to support control functions.

These peripherals assume a specified role at the time of initial configuration as prescribed by commands sent from the MCU 210. The MCU 210 can re-configure the role and function set of the SU 215 at any given point in time. This feature makes the combination of a plurality of SUs 215 with a MCU 210 in a mesh network 120 a versatile power monitoring and control system.

The SU 215 accurately monitors and logs the amount of energy used by the appliance or system that it is connected to and is capable of predicting the amount of energy required to finish a task at hand from the current state. This allows power resource management in circumstances where energy efficiency or conservation is desired.

Within the mesh network, energy resource allocation and management are based on task and task priority. These priorities are initially set by the user and as the control systems gather usage data and provide it to the platform services system 110, the system 100 can learn about the environment of each mesh network 120 and it can re-adjust control parameters and priorities based on usage patterns. SUs 215 send resource allocation requests to the MCU 210 to negotiate power resources based on availability and task priority.

Resource availability can be based on a number of parameters, such as type of resource (grid/generated (solar/wind)), time of day, tariff, peak load demand schedules etc. A number of external factors can also considered when resource availability is computed by the MCU. For example, based on the function types requesting for resources with the mesh network 120, the MCU 210 can request external data to be sent to it from the platform services system 110. This could be weather data, for example, in the case of photovoltaic (PV) solar arrays or HVAC systems, or can include usage patterns from historical data or prediction factors based on computed projections.

The MCU 210 continuously monitors and computes resource availability and allocates available power to SUs 215 based on priorities.

SUs 215 are profile-based and have a designated function, which is assigned a function type. Each function type has a number of defined tasks. Each task consists of a number of steps. Priorities are assigned to function type and task.

The table below illustrates an example of function priority and task priority for a heating, ventilation and air conditioning (HVAC) system that draws mains power via an SU 215:

| Function | Function Type | Function Priority | Task | Task Type | Task Priority | Step |
|---|---|---|---|---|---|---|
| HVAC | 2 | 2 | MaintainSteady Temperature | User | 1 | Check Temp Sensor If Temp < Set Point Is yes, turn on heating/cooling |
| | | | Pre-Heat/Pre-Cool with loss compensation | System | 3 | Check Temp Sensor Is Temp < Set Point If yes, compute time required to heat Request resource allocation Go to Task Maintain Steady Temperature |
| | | | Pre-Hear/Pre-Cool with compensation loss | System | 5 | Calculate loss based on previous history and time of use Adjust set point with loss compensation factor Request excess resource allocation Go to Task - Pre-Heat/Pre-Cool |

Functions and tasks are assigned a priority of 1-5, where 1 represents highest priority and 5 represents lowest priority status. In the above example, the HVAC system is assigned a priority of 2. It has 3 Tasks with priorities of 1, 3 and 5 respectively. Each task has a number of steps.

In the above example, the HVAC system is assigned a priority of 2 and task 'Maintain Set Temperature' is assigned a priority of 1. This task is of type 'User' and has a priority of 1. When this task is activated, the MCU 210 will allocate power at the highest priority even though the function is only priority 2. All 'User' tasks are considered equivalent to a manual override and get immediate resource allocation. On the other hand, the task 'Pre-Heat or Pre-Cool' is a 'System' Task and has a priority of 3. This SU 215 will only get resource allocation if there is power available after all function priority 1 and task priority 1 and 2 allocations are complete. Task priority 3 and above are considered green mode operation and are only allocated resources when green power (e.g. energy from renewable resources) is available.

All SUs 215 are required to send an estimate of resource required and the duration for which it is required to the MCU 210. The MCU 210 in some instances can then push a 20 lower priority Task ahead of a higher priority Task if the quantity and duration of the resource required fits within the computed availability estimates for the requested duration. This can only happen if the higher priority task cannot be completed within the resource availability estimate. This enables the mesh network 120 to effectively utilise available resource with minimal or no waste.

Any manual intervention or control commands sent via a client computing device 130 by a user take the highest priority. For example, a user can turn a Satellite Unit on/off at any given time via the user interface hosted by the user interface module of the web services 254. The MCU 210 can also turn off devices operating out of control cycles, such as pool pumps, when there is a shortage of available resources.

The combination of the MCU 210 and SUs 215 allows the mesh network 120 to avoid a single point of failure and also extend the physical range of operation. ZigBee is one preferred base protocol used for communication within the mesh network 120, although other suitable medium-short range wireless communication protocols can be used instead. The mesh network 120 employs a proprietary Envelope Service Protocol over ZigBee to enable secure cross-grid communication in case of failure by a MCU 210. This is described in further detail below with reference to FIG. 11.

The platform services system 110 consists of a number of hosted services as part of an overall platform system 100 to enable creation and operation of a number of mesh networks 120 in parallel.

Database services 250 within the platform services system 110 acts as a central repository of all information sent from the MCUs 210 to the platform services system 110. Database services 250 consists of relational objects capable of storing information about each SU 215 within the mesh network 215. This is a shared service and is common to all mesh networks 120 within the overall platform system 100. This allows the prediction engines within learning module 262 access to large sets of data in different geographic locations to make more accurate predictions.

The listener service 256 is a specialised data transfer service responsible for data collection and transmission to and from all MCUs 210 within the power control system.

The listener service 256 is equipped with handling and management of SMDT and ESP messages from the MCUs 210 of many respective mesh networks 120 at a very high rate. A number of servers in a farm architecture may be used to perform this service. A desirable design criterion for this service is to handle all data processing transactions within 1 millisecond.

Web services 254 comprise a number of web applications to manage and interact with the local mesh networks 120. Functions and responsibilities of the web services 254 include the following:
 User application portal;
 Administration and management portal;
 Reporting;
 Debugging and operational support applications; and
 External data request and collection.

The platform services system 110 comprises a rich set of APIs 252 for 3rd party applications to interact with the platform system 100. These services are technology agnostic and can be accessed from any programming language and operating system hosting it.

All platform system services are monitored by the monitoring and recovery service 258. At any given point in time, there are at least two mirrored instances of this service active. If one fails, the mirror recovers the failed service. Although there are multiple monitoring and recovery services 258 active, to avoid contention, only one is allocated the task of monitoring other services within the platform services system 110. By design, this service is not intended to fail and it requires a special shut down procedure.

Alert services 260 allows a user to set up alert parameters for a particular mesh network 120 that that user controls or is subscribed to (for example because it is established at the user's place of residence and the appliances are owned by that user). In addition to this, there are a number of system level alerts that are also generated as early warning and/or failure notifications. Alert services 260 operate as a separate (virtual or dedicated) server unit as it handles all communication via email, SMS or push notification where applicable.

Figure 2:
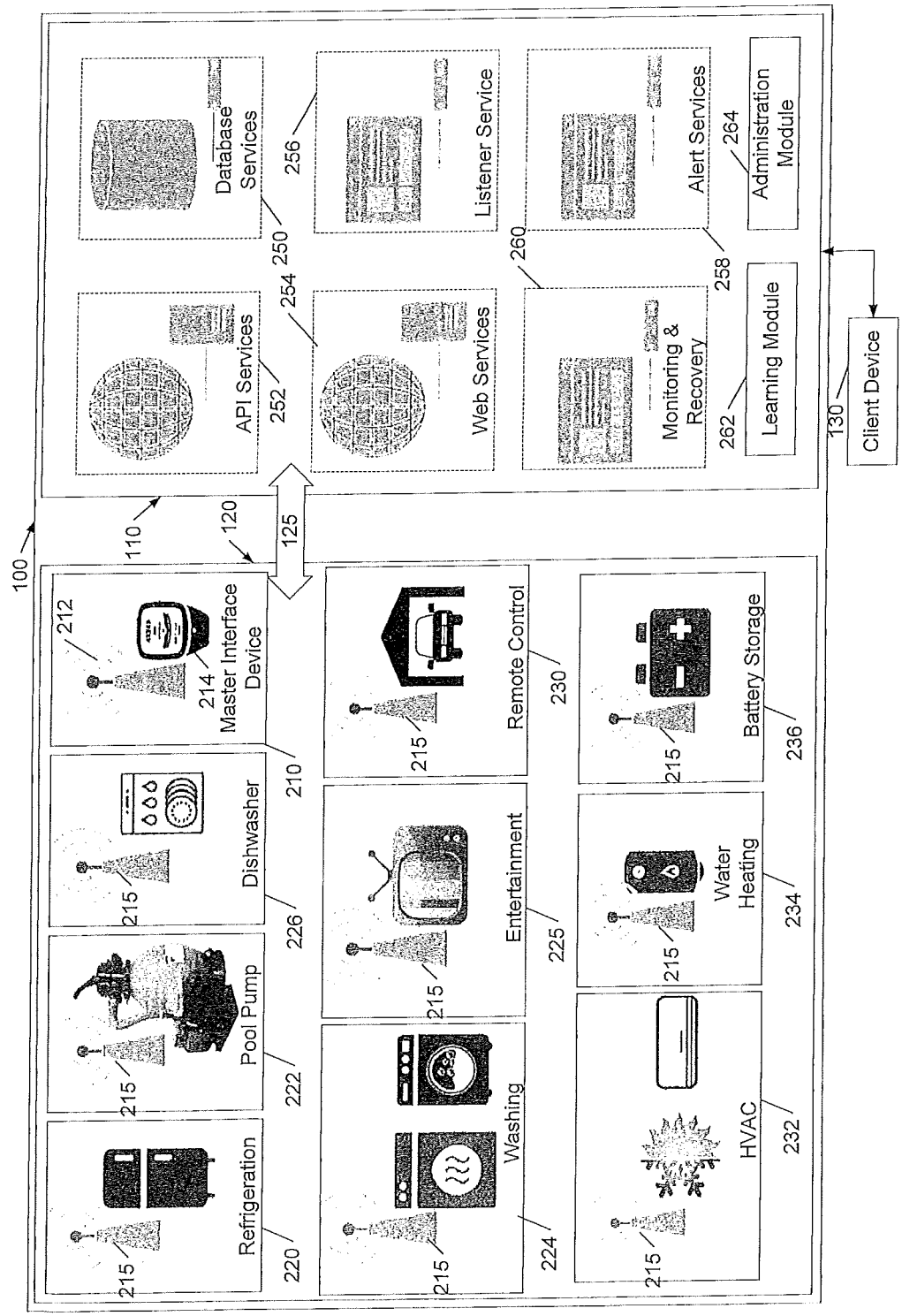
FIG. 2 is a block diagram of an example of the system of FIG. 1.

Referring particularly to FIGS. 1 and 2, a power control system 100 is described in further detail. The system 100 relies on a platform services system 110, which comprises a plurality of servers to provide various platform services for the system 100.

Multiple servers will be employed as part of platform services system 110 and such multiple servers may be distributed or co-located. Any of the servers may be executed on physical hardware or may be virtualized. Each such server has at least one processing device and has access to memory that stores executable programme code such that, when the programme code is executed by the at least one processing component, the one or more servers are caused to perform functions or tasks as described herein.

The system 100 allows multiple client devices 130, such as hand held computing devices (e.g. smart phones, tablets, computing devices or laptops) or desktop client devices, to communicate with the platform services system 110 over a network, such as a public network 135. The public network 135 may include the internet and/or various other publicly accessible networks, including wireless and wired networks.

System 100 further comprises one or multiple local mesh networks 120 that each communicate with platform services system 110 via a cellular data network 125. If local mesh networks 120 are within sufficient proximity to each other, they may communicate via a wireless local area network protocol, such as ZigBee, for example. Each of the local mesh networks 120 comprises an interface device, which is the master control unit (MCU 210) and at least one power control device configured to control power to an appliance. Each such power control device is a satellite unit (SU 215) as described herein and is effectively slaved to the MCU 210. Each of the SUs 215 acts as a remotely controllable power switch or power control unit dedicated to a particular electrically-powered appliance, plant or equipment. The MCU 210 communicates with the platform services system 110 via a cellular data transceiver and communicates with the SUs in the local area mesh network 120 via a local area transceiver, for example using the ZigBee local area wireless communication protocol.

One example of how the local mesh network 120 may be arranged is for control of domestic appliances within a household, such as in a rural environment or in an urban or suburban domestic context. The local mesh network 120 may also be of particular use in office environments and in small and large business environments where multiple appliances and/or plant or equipment draw power.

In the example shown in FIG. 2, the local mesh network 120 as applied to a domestic situation may comprise 1, 2, 3, 4, 5, 7, 8, 9, 10 or more power control devices 215, each communicating with, and being configured and controlled by, one MCU 210. For example, a SU 215 may be used for control of a refrigerator 220, a pool pump 222, washers and/or dryers (laundry apparatus 224), a dishwasher 226, entertainment units 228, such as televisions or home theatre units, remote control devices such as garage door openers 230, heating, ventilation and air conditioning (HVAC) systems 232, water heaters 234 and battery storage units 236. There are a number of different types of appliances and/or equipment, the power to which can be controlled by an SU 215, and each type of appliance or plant or piece of equipment may have a distinct function for which different control paradigms may be desired. In the above list of examples illustrated in FIG. 2, each of the appliances has a different function type. However, the local mesh network 120 may comprise multiple ones of the same type of appliance or equipment and different SUs 215 may therefore may be configured with the same function type.

Depending on the function type of the appliance or equipment, it may need to be always on, intermittently on, on only on user command or automatically on according to automatic operational settings or parameters. As described herein, the MCU 210 in combination with the SUs 215 allow remote user control of the various appliances within the local mesh network 120 while also allowing selective power consumption and prioritising of certain functions over others, in order to make efficient use of limited (possibly costly) energy resources or make use of energy derived from renewable resources (e.g. a solar panel or a local wind turbine) instead of energy from the power supply grid. The control paradigm of each of the SUs 215 is user configurable via a client device 130 through the web services 254 of platform services system 110.

Figure 3:
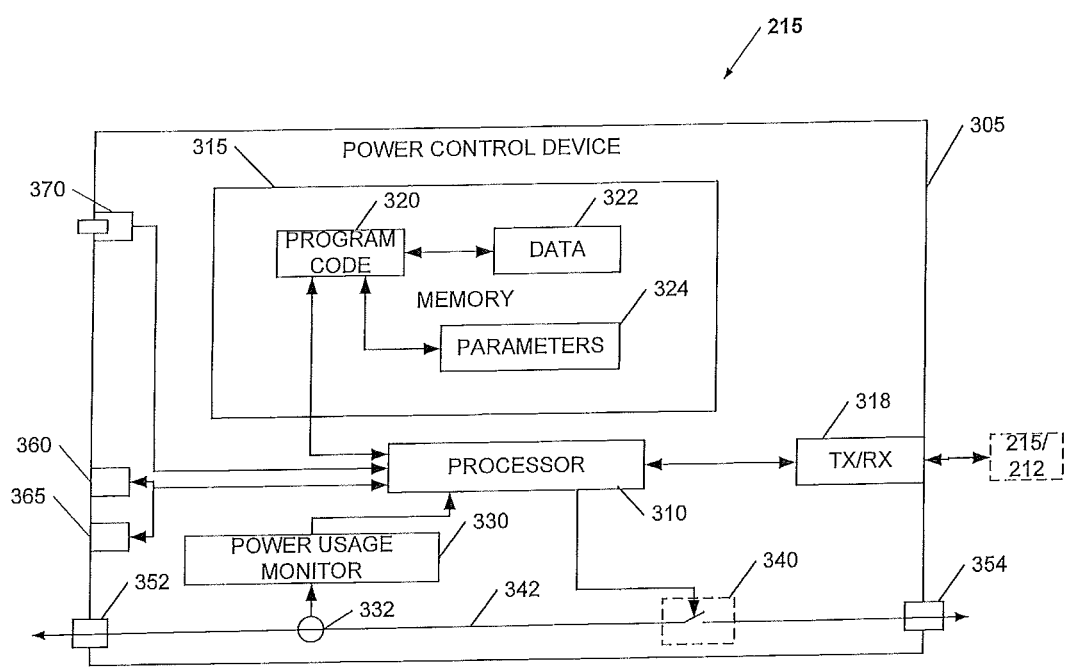
FIG. 3 is a block diagram of a power control device according to some embodiments.

Satellite units 215 are shown and described in further detail in relation to FIG. 3. As shown in FIG. 3, each SU 215 comprises a housing 305 that contains a processor 310, a memory 315 and a wireless transceiver 318, which may be carried on a printed circuit board (PCB) contained in the housing 305. The SU 215 has a mains power interface port 352 and an appliance power interface port 354 in order to supply power to the appliance where the SU 215 is physically and electrically interposed between the appliance and the mains power supply. The PCB within the housing 305 contains a current sensing circuit 332, for example including a shunt resistor with a low resistance (e.g. 0.001 ohms) that feeds into a power usage monitor circuit 330 (shown as current/voltage sense circuits in FIG. 6). The output of the current sensor 332 is used by the processor (after amplification by the power usage monitor 330) to determine the amount of power being supplied to the appliance over time. The processor 310 stores the power usage data in a part of memory 315, which may be random access memory (RAM) or other volatile or non-volatile memory. The stored power usage data is provided periodically to the MCU 210 for uploading to platform services system 110 via the listener service 256 and the power usage data is ultimately stored by database services 250.

The processor 310 controls a switch 340 to interrupt supply of power along a mains supply line 342 within the SU 215. The switch 340 may comprise a Triac or relay or a combination of switching elements, for example.

The SU 215 comprises a push button 370 that, when pressed, provides a direct input to the processor 310 in order to initiate wireless communication pairing of the SU 215 with the MCU 210 (during configuration of local mesh network 120). The push button 370 may also be used, if held down for a longer period for example, to trigger the processor 310 to run a self-diagnostic check and send its self-diagnostic information to the MCU 210.

The SU 215 may further include an infrared port 360 in order to allow line of sight communication with an appliance that is hard-wired into a household or business electrical system, such as a split system air-conditioner. In this instance, the infrared port 360 functions to transmit control signals to such an appliance, including on/off control signals, and setting reconfiguration signals, such as to reset a desired temperature in a room, for example.

In embodiments employing an infrared (or other wireless line of site) communication port 360, the SU 215 may also comprise a temperature sensor 365 or other local environment sensor in order to provide data in place of power usage data. In the example where the appliance to be controlled by the SU 215 is a split system air-conditioner, the SU 215 does not in fact supply the mains power to the appliance via the interface 354 and must rely on commands via the infrared port 360. Thus, in order to determine how much power is used by the split system air-conditioner, the user must provide certain information regarding that system via a client device 130, such as a manufacturer and model number, to allow platform services system 110 to look up the power rating of that system. In this way, the sensed temperature data from temperature sensor 365, together with timing and control data known by the processor 310 can be stored in the data memory 322 and uploaded to the platform services system 110 via the MCU 210 to allow power usage to be calculated as a function of temperature change over time and power rating of the system.

Figure 9:
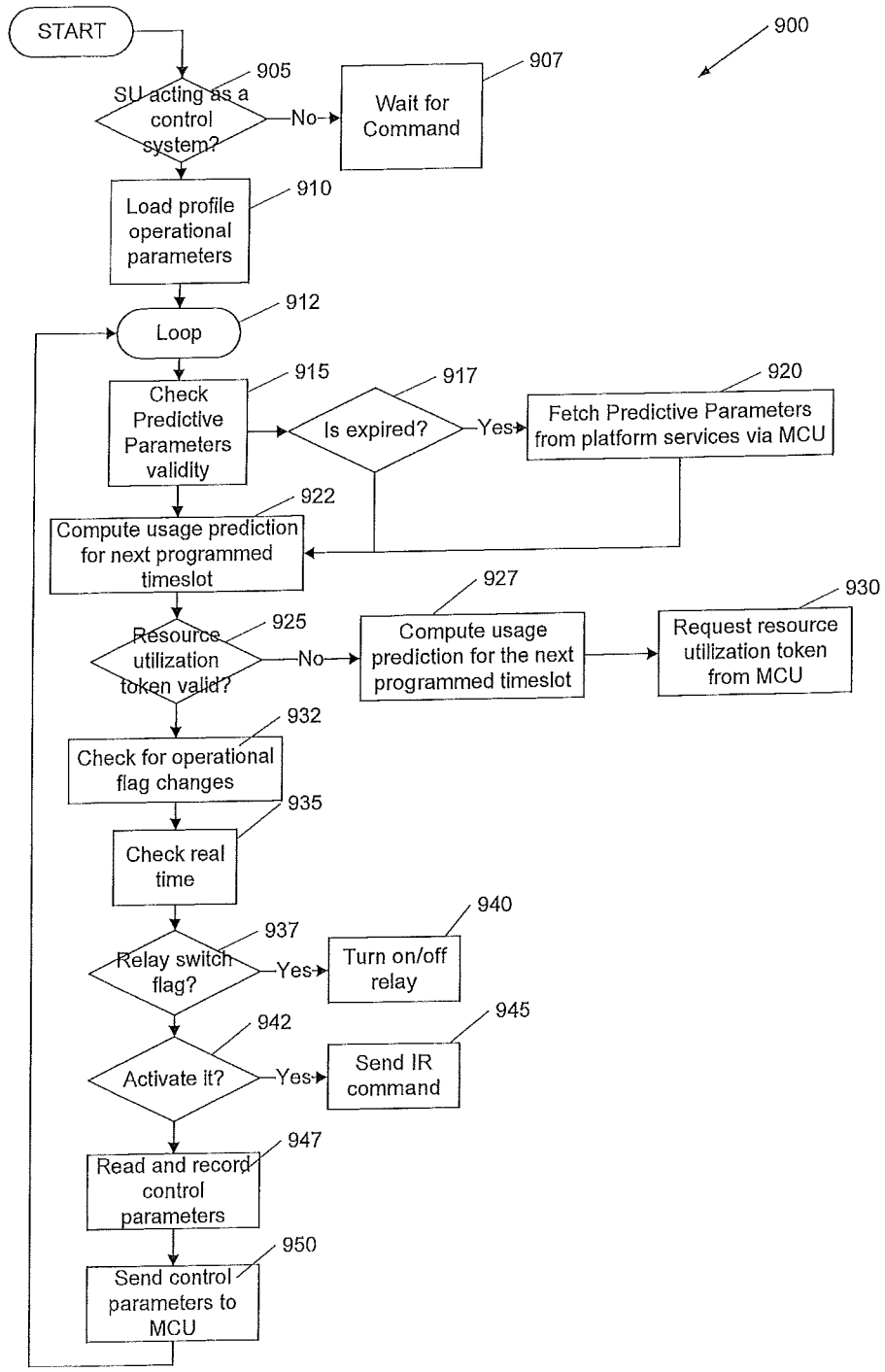
FIG. 9 is a flowchart of a method of operation of the power control device according to some embodiments.
Figure 10:
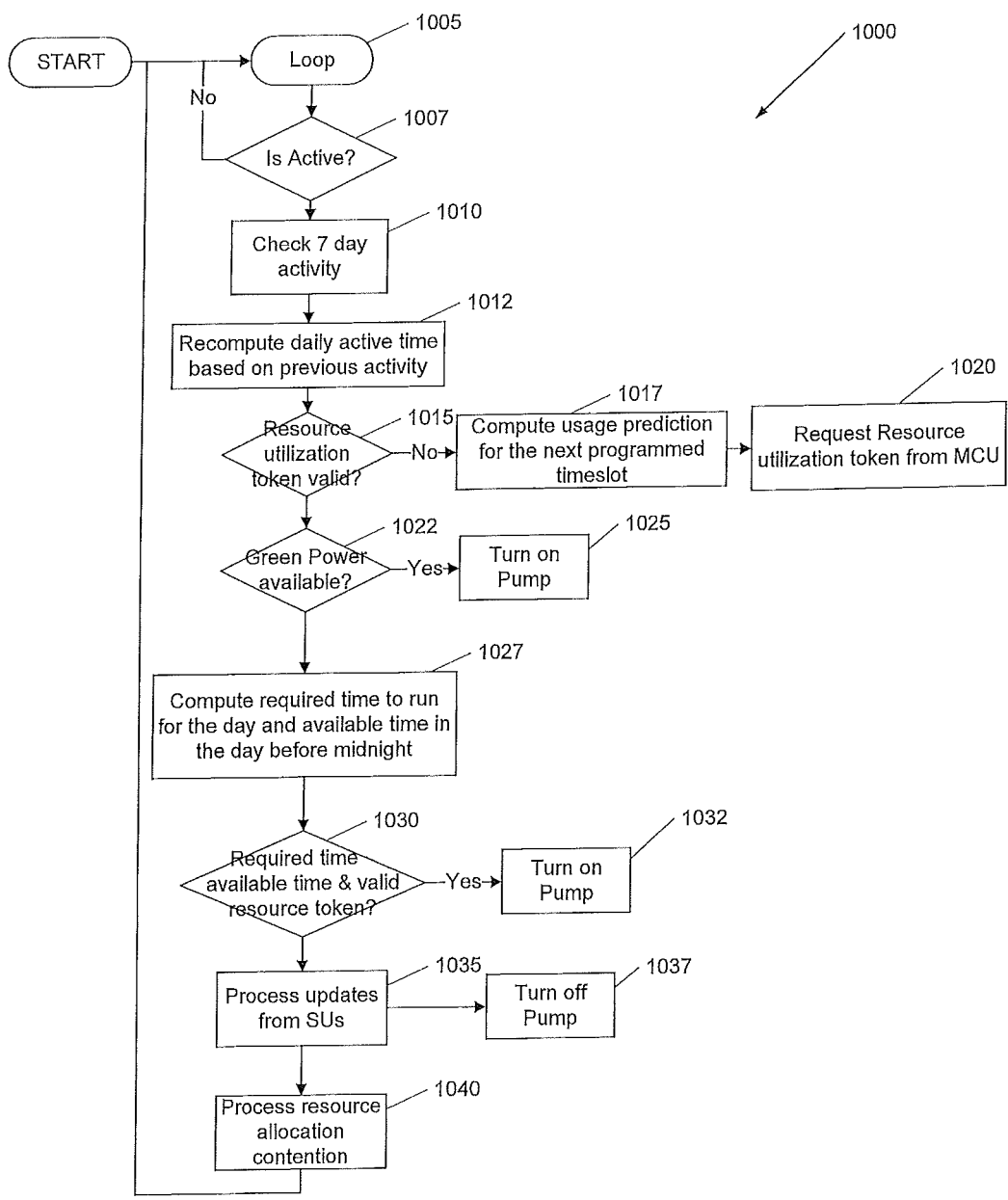
FIG. 10 is a flowchart of an example method of operation of a power control device when controlling power to a pump according to some embodiments.

Each SU 215 has a portion of memory 315 that is non-volatile in order to store the program code 320 which includes the ZigBee software stack (or another communication protocol), plus software to implement a method 900 on a control loop such as is illustrated in FIG. 9. Additionally, such non-volatile memory stores function and control parameters 324 that are received from MCU 210 and define the function type according to which the SU 215 is to control the appliance, together with priority and task information according to which the appliance is to be controlled. The program code 320 is also executable in order to perform the dynamic device addressing technique as described herein. Further, the data memory 322 or other parts of memory 315 may store a resource allocation token that authorises the SU 215 to switch power to the appliance for a specified time.

Figure 4:
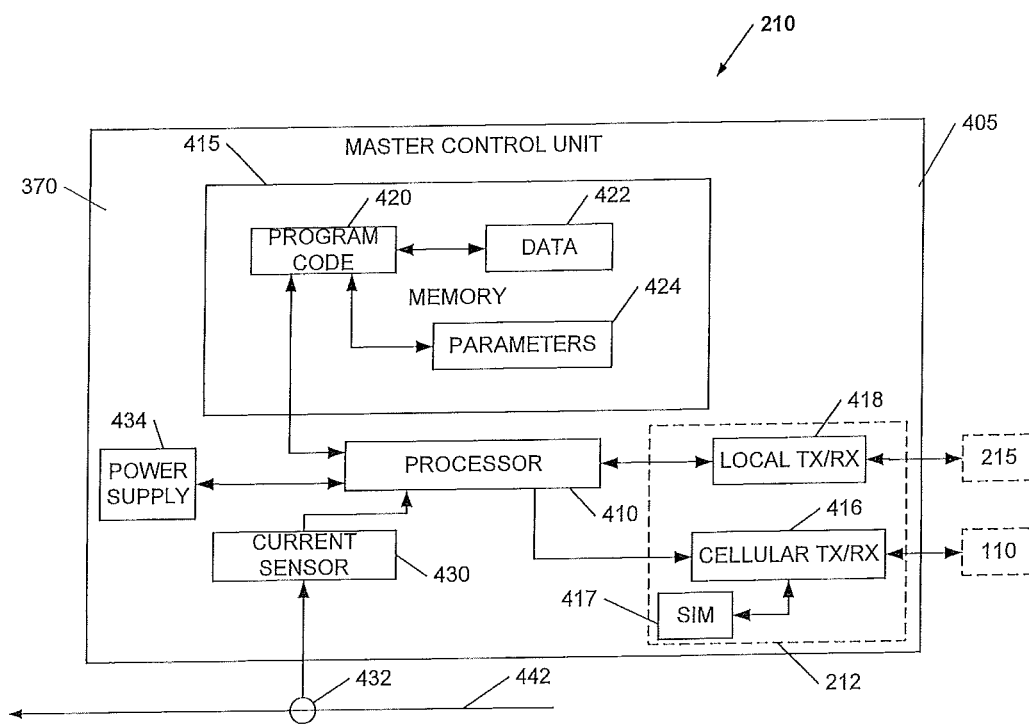
FIG. 4 is a block diagram of a master control unit according to some embodiments.

Referring now to FIG. 4, the MCU 210 is described in further detail. The MCU 210 has a housing 405 to contain a PCB (not shown) that carries the electronic circuitry of the MCU 210. The MCU 210 has a processor 410 and a memory 415 that is accessible to the processor 410. The memory 415 comprises stored program code 420, data memory 422 and function and control parameters 424. The MCU 210 further comprises a communication interface 212 that includes a local area wireless transceiver 418 and a cellular data transceiver 416, plus a subscriber identity module (SIM) 417 for the cellular data transceiver 416.

The MCU 210 further comprises a power supply 434 to supply power as appropriate to the components of MCU 210, with that power being derived from mains power 422. MCU 210 further comprises a current sensor 432, which may be in the four of a three phase clamp, for example including a current transformer. The current sensor 432 provides output signals to a current sensor circuit 430, which supplies output signals to processor 410 indicative of the sensed current in the mains power supply line 422, in order to monitor power supplied from the power supply grid to the household or business. Where the household or business has the capability to supply energy back to the grid, for example due to a solar power generation system or a wind power generation system, the MCU 210 may further comprise a current sensor (and associated circuitry) to measure the amount of power being supplied back to the grid. In some situations, the MCU 210 may comprise battery storage units 236 to store locally generated energy, the power of which may be monitored and consumed locally rather than being returned to the grid.

The program code 420 comprises executable code to allow the MCU 210 to perform the functions described herein, including communicating with the platform services system 110 and the SUs 215, as well as transmitting configuration commands to the SUs 215 and transmitting to the SUs 215 control commands received from a user via the platform services system 110, for example to remotely turn on or off one or more of the appliances in the local mesh network 120. The function and control parameters 424 dictate the behaviour of the MCU 210 and, together with the program code 420, are used to cause the MCU 210 to execute the method 800 illustrated by the control loop shown and described in relation to FIG. 8.

Figure 5:
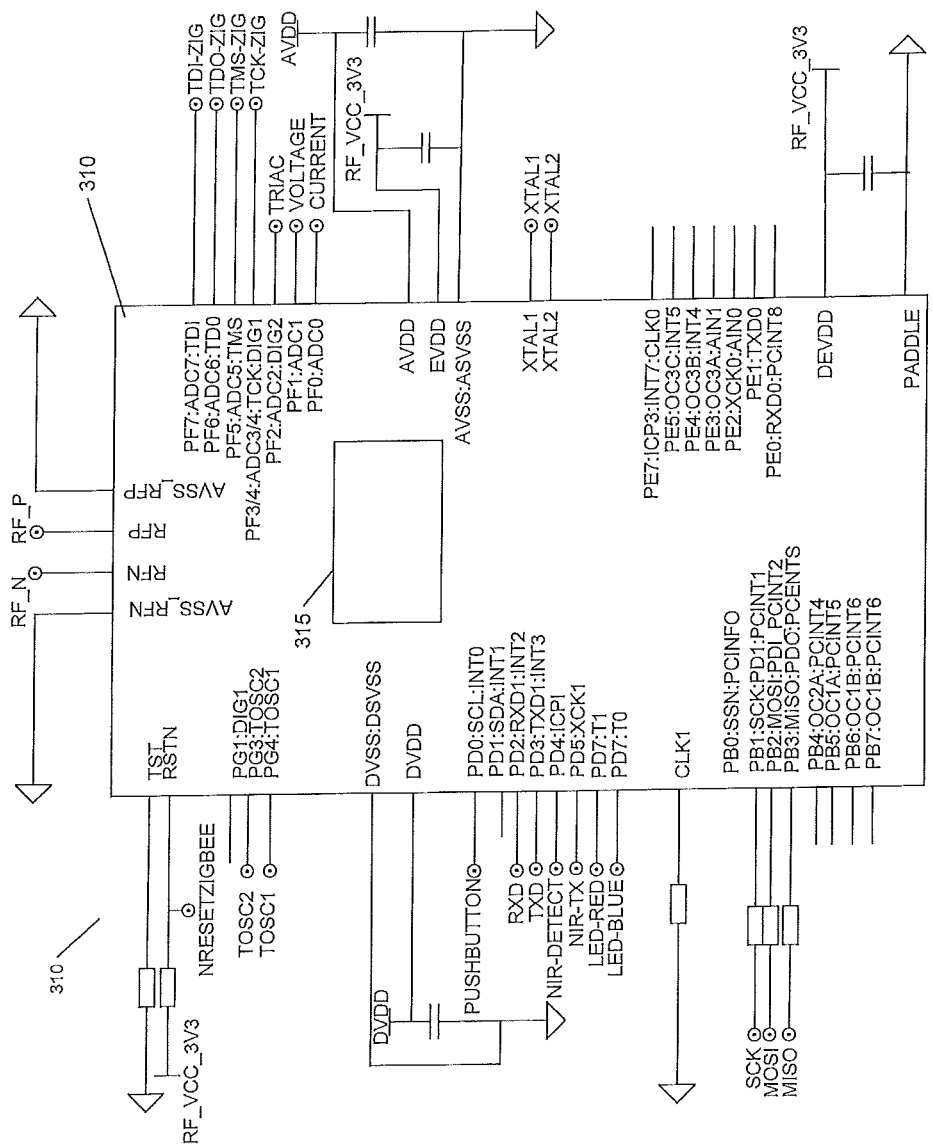
FIG. 5 a schematic diagram of a processor of power control device according torn some embodiments.

FIG. 5 is a schematic diagram of a processor 310 of an SU 215. The processor 310 is carried by a PCB (not shown) and comprises memory 315 internally of the processor chip. In the example shown, the processor 310 may be a microcontroller such as the ATMEGA2564RFR2 chip from Atmel. The processor 410 of the MCU 210 may comprise a microcontroller similar to the processor 310 (but possibly with more memory or processing capability) or similar to that described and shown in PCT/AU2014/000119, for example.

Figure 6:
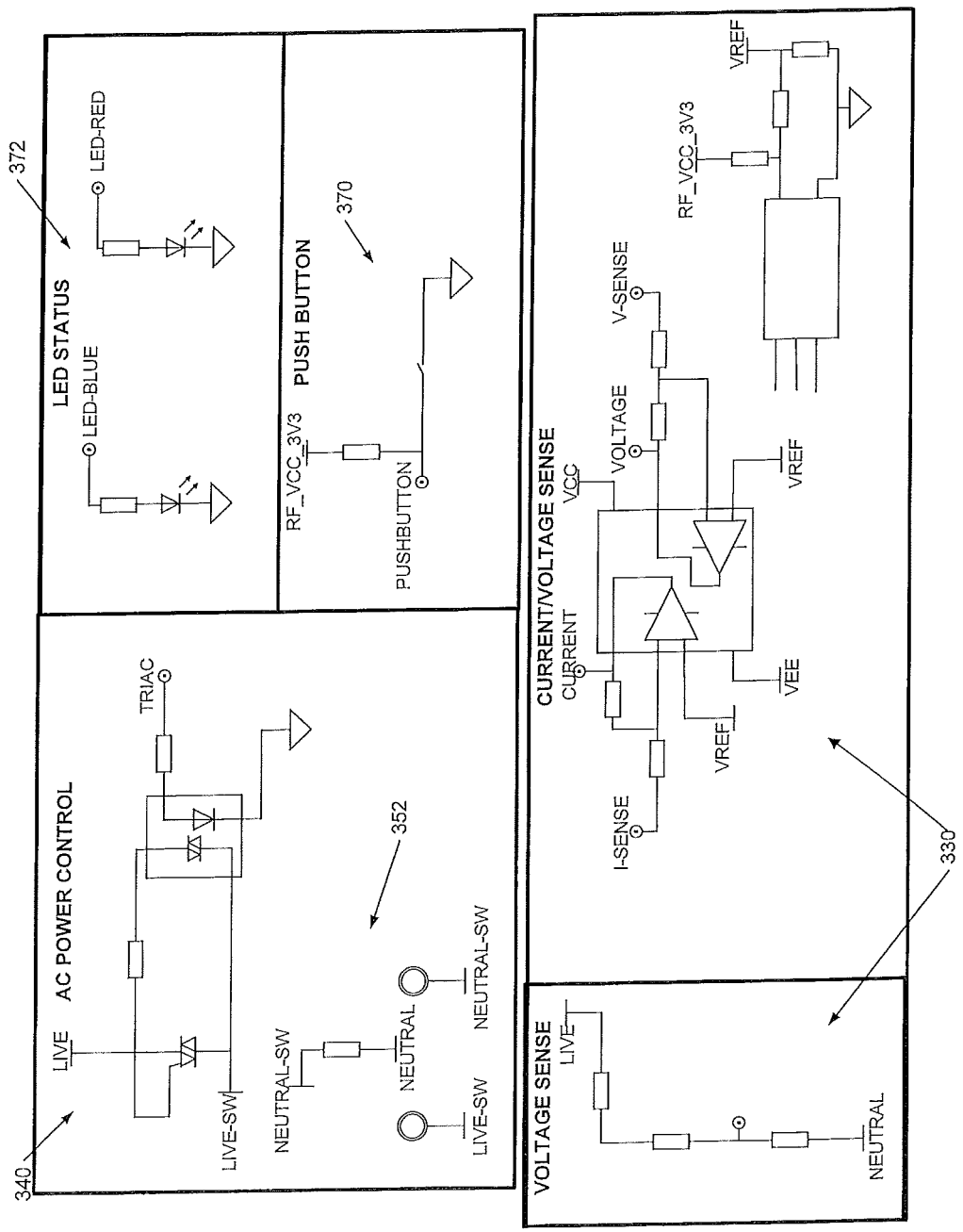
FIG. 6 is a schematic diagram of power usage monitoring circuitry, current sensor circuitry, power control circuitry, actuator circuitry and lighting circuitry used in the power control device according to some embodiments.

FIG. 6 illustrates example circuits that interface with the processor 310, such as an AC power control circuit (switch 340), the shunt resistor of the current sensor 332, the current and voltage sensing circuits of the power usage monitor 330, the push button circuit 370, plus circuits 372 comprising red and blue status LEDs. The status LEDs may be used to indicate that the SU 215 is functioning normally, is in the process of pairing or is not functioning properly or is not in communication with the MCU 210, for example.

Figure 7A:
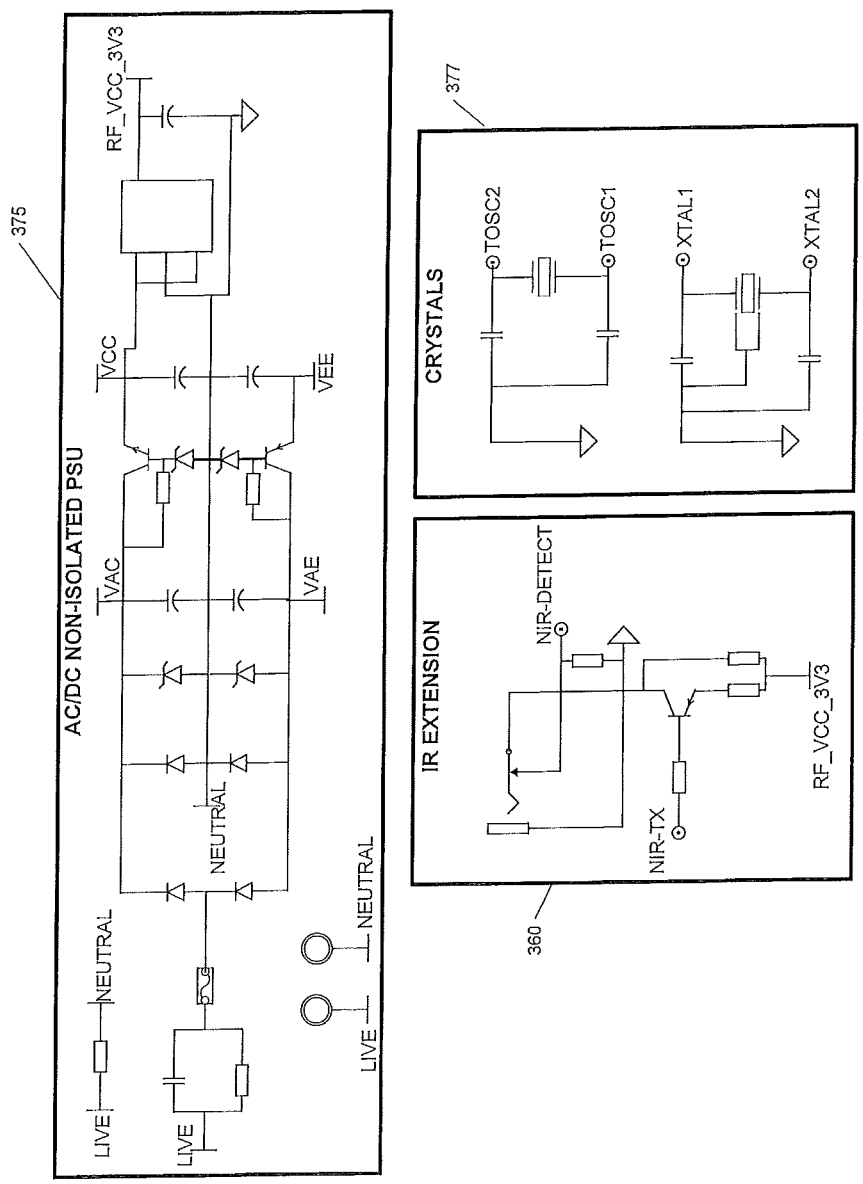
FIG. 7A is a schematic diagram of power supply circuitry, infrared transmission circuitry and timing circuitry used in the power control device according to some embodiments.
Figure 7B:
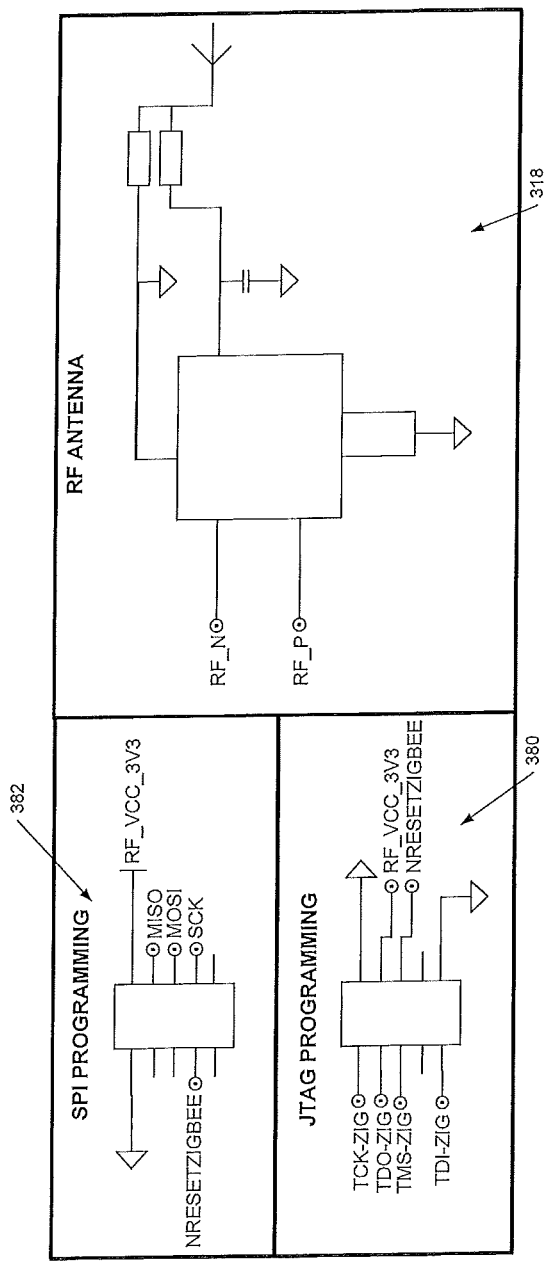
FIG. 7B is a schematic diagram of local area wireless transceiver circuitry and programming circuitry used in the power control device according to some embodiments.

FIG. 7A illustrates an example power supply circuit 375 for supplying power to the components of the SU 215 from the mains power socket when the SU 215 is appropriately coupled thereto. FIG. 7A also shows example timing circuits 377 and 35 circuitry for infrared transmitter 360. FIG. 7B includes example circuitry for the local area wireless transceiver 318 and for testing and programming interface circuitry (JTAG programming 380 and SPI programming 382).

Figure 8:
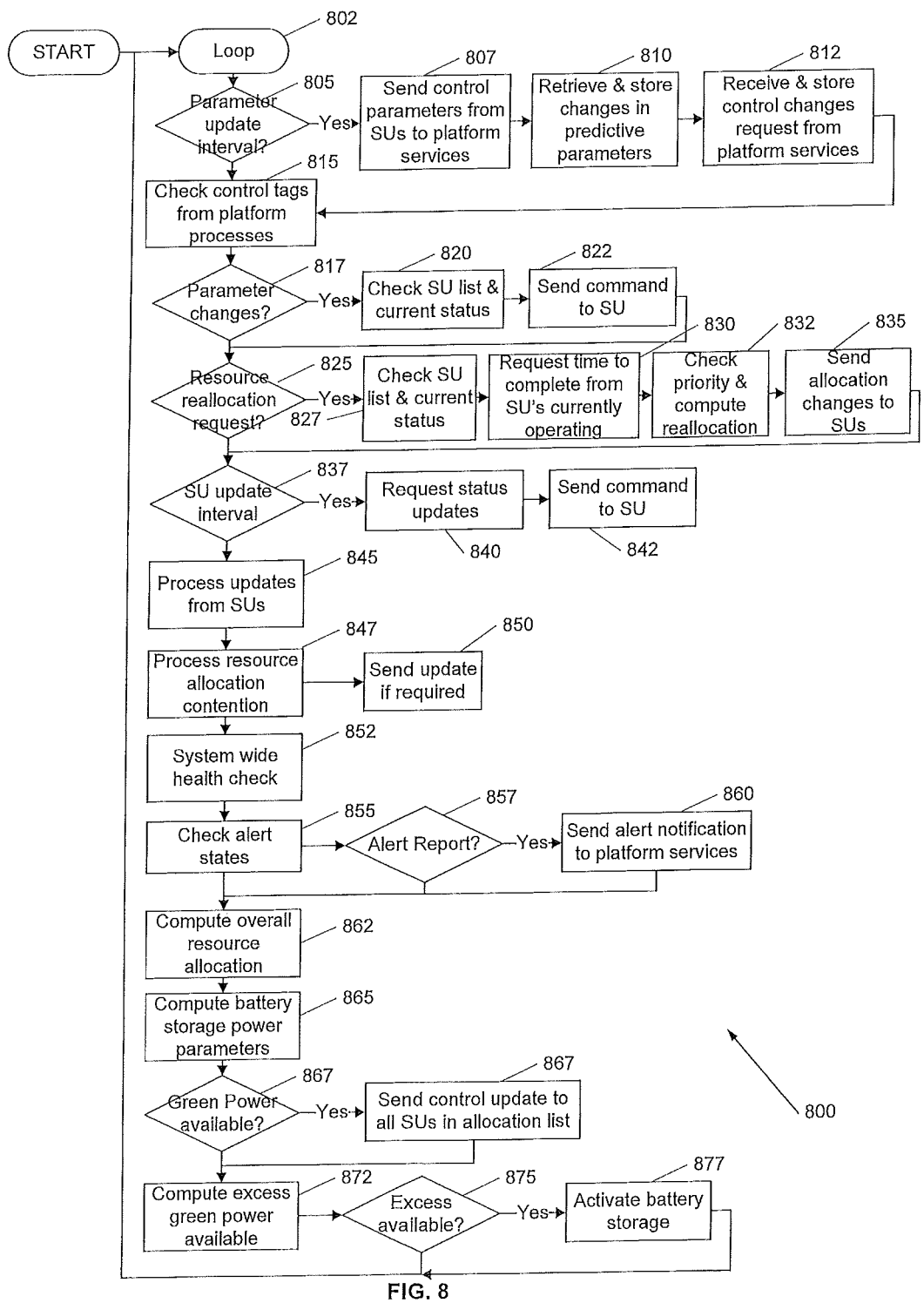
FIG. 8 is a flowchart of a method of operation of the master control unit according to some embodiments.

Referring also now to FIG. 8, a control method 800 for each MCU 210 is described in further detail. At 802, the control loop is entered, following which the MCU 210 checks at 805 whether a parameter update interval has expired. This interval may be in the order of 15, 30 or 60 minutes, for example. If the parameter interval has expired, then at 807, the MCU 210 sends control parameters collected from the SUs 215 to the platform services system 110. At 810, the MCU 210 receives and stores any changes in the predicted parameters calculated by the platform services system 110. At 812, the MCU 210 receives and stores control change requests from platform services system 110.

After 805 or 812, the MCU checks at 815 whether any control flags have been set by platform services system 110 in the commands received therefrom. If at 817 there has been a parameter change (eg. indicated by a control flag), then the MCU 210 checks the SU list and the current status of the SUs 215 on that list at 820 and then sends appropriate commands to SUs 215 at 822 for only those SUs that have had their parameters changed.

At 825, the MCU 210 checks whether a resource reallocation request was received and, if so, then at 827, the MCU 210 checks the SU list and the current status of SUs 215. Then at 830, the MCU requests from each of the SUs 215 the time determined by that SU to complete performance of a task that is currently underway (operational). At 832, the MCU checks the priority of each of the tasks being executed by SUs 215 and determines a reallocation of energy resources among the SUs to complete the tasks according to the task and function priorities for the SUs 215 in the tasks that they are performing. At 835, the MCU 210 generates and transmits resource allocation tokens to those SUs that are to be allocated resources (i.e. power) according to the resource requests. Each resource allocation token specifies a start and end time that together define a validity period of the token. Outside of that validity period, the token is not usable and the SU 215 will need to make a further resource allocation request if it has not been able to complete the task within the validity period of that token.

At 837, the MCU 210 checks whether a SU update interval has expired and, if so, then at 840, the MCU 210 determines whether a status update is required. If a status update is required, then a command is sent from the MCU 210 to one or more of the SUs at 842, requesting a message back from the SUs 215 indicating their operational status. At 845, the updates from the SUs 215 regarding their respective statuses are processed by MCU 210.

At 847, the MCU 210 processes any resource allocation conflicts or contentions, determining which resource allocation request can be satisfied, if not all of them can be satisfied, and then an update is sent to the SUs 215 that have made resource allocation requests, either by transmission of a token or denial of a token at 850.

At 852, the MCU 210 conducts a system wide health check. At 855, the MCU 210 checks for alert states and, if an alert report is determined to be required at 857, then at 860 the MCU 210 generates and sends an alert notification to the platform services system 110.

At 862, the MCU 210 computes the overall resource utilisation for the mesh network 120 and then determines at 865 battery storage parameters, such as battery storage capacity, if battery storage is provided within the network. If at 867 MCU 210 determines that renewable energy (sometimes called green power) has been generated and is available for use, then at 870, the MCU 210 sends control updates to all SUs 215 in the SU list that control appliances that rely on renewable energy for operation, indicating that they can turn on. At 872, the MCU 210 computes excess renewable energy availability and, if it is determined at 875 that there is such excess availability, then the excess renewable energy is provided to battery storage at 877.

Referring now to FIG. 9, a method 900 of operation of one of the SUs 215 is described in further detail. If at 905 the SU 215 is determined not to be acting as a power monitoring and control system, but is instead acting simply as a remotely controlled switching device (e.g. according to user input via a client device 130, communicated through to the SU 215 via the platform services system 110 and MCU 210), then the SU 215 simply waits for a command at 907. This operational state (acting as a switching device or a control system) is user configurable. Otherwise, then the SU 215 loads profile operational parameters at 910 and begins running a control loop at 912. As part of that control loop, the SU 215 checks the validity of predictive parameters stored in 324. If at 917 the SU 215 determines that the stored predictive parameters have expired (i.e. not been updated more recently than a predetermined time), then at 920, the SU 215 sends a message to the MCU 210 to fetch predictive parameters from the platform services system 110. The SU 215 then computes usage prediction for the next programmed timeslot of the SU 215 at 922 based on predictive parameters received from the platform services system 110 and stored in parameter storage 324 within memory 315. For example, depending on the time of day, a hot water system can be predicted to be required for domestic use at certain times in the morning and potentially also at certain times in the evening, but are unlikely to be required at certain times during the day or the middle of the night. Similar usage based predictions (example generated by learning module 262 of the platform services system 110) can be determined for HVAC systems.

At 925, the SU 215 checks whether a resource utilisation token is stored in RAM and whether it is valid. If it is not stored or is not valid, then at 927, the SU 215 computes a usage prediction for the appliance to which it is controllably coupled for the next programmed timeslot and then at 930 the SU 215 generates and sends a request for a resource allocation/utilization token from the MCU 210 according to the predicted power requirements of the appliance to complete a predicted task. In some instances, such prediction may involve calculations based on multiple inputs that may include environmental parameters. For example, if an SU 215 is configured to control a cooling function of an HVAC system, then the SU 215 may take a temperature sensor reading using temperature sensor 365 and determine a difference in temperature between the current temperature and the desired temperature set point and may check historical data indicating for that HVAC system how much energy was used to cool the space in which it is positioned by one degree or a fraction of a degree, and then determine how much energy is predicted to be required for the present cooling task. Another input to this calculation may also be a time period over which the cooling is desired to be performed, which may dictate a power consumption level of the HVAC system and may therefore affect the overall predicted power consumption for the task.

At 932, the SU 215 checks for operational flag changes and then at 935 checks real time. Then at 937, the SU 215 checks whether a relay switch flag has been set and, if yes, then at 940 the SU 215 switches on or off power to the appliance via switch 340.

Alternatively, if the SU 215 controls the appliance by control signals transmitted from the infrared port 360 at 942, then these are used to generate and send appropriate control signals at 945, rather than using a switch 340.

At 947, the SU 215 reads and records control parameters, such as consumed power, current temperature and other operational and/or environmental parameters. These data are stored in memory 324 as they are accumulated over time and then they are sent to the MCU 210 periodically. The period at which the stored power usage data and other measured or determined control, temperature or environmental data are sent to the MCU 210 may coincide with the time taken to perform the control loop initiated at 912 or may be a less frequent time interval, for example.

A method 1000 of controlling a pump is described in further detail, as one example of an appliance that an SU 215 can be used to control. In this example, the pool pump is an example of a type of appliance that can often be automatically turning on more than is necessary and may run during peak energy consumption times unnecessarily. The function type for this type of appliance would carry with it a low priority and it would generally be turned on within mesh network 120 only when low tariff rates apply for energy consumption or when excess renewable energy had been generated, for example.

At 1005, the SU 215 enters a control loop and initially determine whether the appliance (in this case, the pump) is active at 1007. If the pump is active, then at 1010, the SU 215 checks the recent usage history of the pump, either by checking locally stored data or requesting such data from the MCU 210. At 1012, the SU 215 recomputes the daily active time based on the previous recorded activity. At 1015, the SU 215 checks whether a valid resource allocation token is stored in memory 315. If no token is stored or it is invalid, then at 1017, the SU 215 computes the predicted usage for the appliance for the next programmed timeslot and then at 1020, the SU 215 generates and sends a resource allocation token request to the MCU 210.

At 1022, the SU 215 determines whether renewable energy is available, and if so, then at 1025, the pump is turned on. Otherwise, the SU 215 computes at 1027 the required time to run for the day and the available time of the day before midnight. If at 1030, the SU 215 determines that the required time is less than the available time and there is a valid resource token, then at 1032, the pump is turned on. However, if the required time is greater than the available time or the resource token is not valid for the required time, then the SU 215 checks at 1035 whether the pump is operating outside of the allowed parameters and, if so, turns off the pump at 1037. At 1040, the SU 215 checks control flag updates from the MCU 210. If a remote control command has been received via a client device 130, for example, then this may cause a control flag update to be sent from the MCU 210 to the SU 215 in order to require that the pump turn on and off, for example. Following 1040, the loop 1005 is repeated.

In order to optimise energy usage, SUs 215 collect energy usage data periodically, at fixed intervals, such as every 1, 2, 3, 4, 5, 10, 15 or 20 seconds or longer time periods. This includes data concerning parameters such as power usage, duration of use, power factor and time of use. These parameters are accumulated and sent to a central server for processing. In order to assist the SUs 215 to work effectively, the SUs 215 require predictive parameters to be computed externally and sent to the SUs 215. The key for success here is to be able to communicate accumulated parameters and receive predictive parameters from the learning module 262 within the platform services system 110.

Due to the relatively small size of the on-board processor 310, the predictive analysis of energy resource (power) usage for an appliance to which the SU 215 is connected cannot be computed locally in the SU 215. Therefore, the data that are collected at the SU 215 are sent to the learning module 262 within the platform services system 110 for analysis. All communication to the platform services system 110 from the SUs 215 is handled by the MCU 210, which maintains the mesh network 120 within the household.

The SUs 215 use ZigBee as its communication protocol. ZigBee is a high-level communication protocol that supports point-to-point and mesh networks. ZigBee's low power consumption limits the communication distance range from 10-100 meters and it requires line-of-sight for achieving the upper end of the range.

Due to the size limitation and local interference that is inherent to the hardware due having a switch-mode power supply, the communication range of the SU 215 is likely to be around 20 meters. In many cases, the MCU 210 may be located more than 20 meters from at least one of the SUs 215. This poses a potential problem in reliably collecting data in a timely manner. The problem may be addressed by increasing the number of SU 215 in the network and having it within 20 meters of each other and the MCU 210. Due to the nature of ZigBee mesh, data packets from an SU 215 to the MCU 210 or from the MCU 210 to the SU 215 will often be routed through the nearest nodes (i.e. other SUs 215) to its destination.

Although this architecture was intended to have the data packets arrive at the destination address without losses, it was found that this was not always the case in real word testing conducted in multiple sites. Some packet losses were seen and information was not received in a timely manner. ZigBee mesh architecture also has one single point of failure which is the co-ordinator, which in this case is the MCU 210.

A Dynamic Device Addressing (DDA) protocol was created to overcome these issues and provide a robust communication platform. The DDA protocol also allows information packets to be transmitted through foster co-ordinates (MCU 210) when the parent governor cannot be reached. The DDA protocol is not part of the ZigBee specification. The DDA protocol allows the mesh network 120 to overcome some of the limitations of ZigBee.

There are two widely used addressing schemes available today, transmission control protocol (TCP) and user datagram protocol (UDP). TCP is more reliable as it is a connection-oriented protocol. When a file or message is sent, the protocol ensures delivery unless the connection fails. UDP is a connectionless protocol. Messages are just broadcasted. The sender does not rely on message receipt communication, so no delivery receipt is sent back.

TCP is resource-intensive and it requires a dedicated hardware and software stack to handle TCP traffic to endpoints. It also requires other hardware, such as routers to handle traffic routing between other devices on the network.

The DDA scheme is described herein as a way of addressing devices on a connectionless layer with a very high degree of reliability. It requires no specialised hardware implementation; it is a software stack with a small footprint, allowing it to be loaded onto most embedded processing devices.

The processor 310 of the SUs 215 have a relatively sized small Random Access Memory (RAM) and can only hold a small amount of accumulated data. Each SU 210 periodically transfers this data to database services 250 on platform services system 110 via the MCU 210 for storage and analysis. Once this data is received by the platform services system 110 and an acceptance receipt is received by the SU 215 via the MCU 210, the SU 215 will clear its RAM and start the next cycle of data accumulation and storage. Therefore, in order to prevent data loss and to minimise the risk of RAM overflow, it is desirable to have a robust communication protocol.

SUs 215 powering large commercial appliances will run out of RAM in a much shorter amount of time than those powering smaller appliances, due to accumulation of large numbers for power values. RAM is a shared space used for normal operation by the processor 310 as well as data storage. A RAM overflow can result in unexpected behaviours outside of normal operational parameters and in most cases reboots. In commercial operations, it is desirable to avoid any crash or reboot so that business as usual is not interrupted and safety issues arising from power disruptions can be minimised or avoided.

The DDA protocol is designed to ensure the power usage and other data 322 stored in the RAM is off-loaded reliably and in a timely manner and to achieve zero data loss.

According to the protocol, each SU 215 sends out a capacity transfer broadcast to nearby nodes (other SUs 215). SUs 215 in the network with more than half their data memory 322 capacity free for storage send back a capacity transfer token. Upon receipt of the token, the SU 215 with the lower available capacity can transfer some or all of its data to the SU 215 that sent the token. Data from SUs 215 stored on other nodes are known as foster data and the SU 215 which stores the data for other SUs 215 is known as a foster node. The foster node becomes responsible for transferring the foster data all the way to database services 250 on platform services system 110 via the MCU 210 for storage and analysis.

An aspect of the DDA protocol is to ensure appliance-related data can only be accessed by authorised users on the mesh network 120. In other words, a user should only be able to access devices on their own mesh network 120. For this security reason, ZigBee does not allow cross network communication and devices can only communicate within a single Personal Area Network (PAN). However, this poses the risk of a single point of failure in the event of a MCU 210 failure. The DDA protocol overcomes this problem by allowing SUs 215 to temporarily communicate outside of its home mesh network 120 if it stops receiving acknowledgements (or other feedback) from the MCU 210 for that mesh network 120. In this situation, the SU 215 can effectively join another network nearby to establish contact with the platform services system 110 and 35 ensure data flow. Any network that hosts SUs 215 from another network is known as a foster network. The mesh network 120 from which the foster data was received is called the parent network.

The DDA protocol also facilitates the SUs 215 to leave a foster network and re-join the parent network when the parent network again becomes available. When foster data is received by the listener service 256 on platform service system 110, listener service 256 (or alternatively alert services 260) marks the parent network with a fault state. The alert services 260 may also maintain a list of SUs 215 in foster networks. In addition to this, a fault state alert may also be generated by alert services 260 if a mesh network 120 remains in a fault state more than a predetermined time, such as 30 minutes for example. When a MCU 210 resumes operation, the direct receipt of messages from that MCU 210 causes listener service 256 to report the availability of that MCU 210 to the alert services 260. The alert services 260 marks that MCU 210 for review and sends all foster SUs 215 belonging to this particular network a notification to leave the foster network and resume connection to the parent network. The alert services 260 only resets the fault flag of the parent network once data from SUs 215 starts arriving from its parent MCU 210.

These features make the SUs 215 with DDA capable of securely hopping between mesh networks 120 if necessary and then resume communicating with the parent network without data loss.

Figure 11:
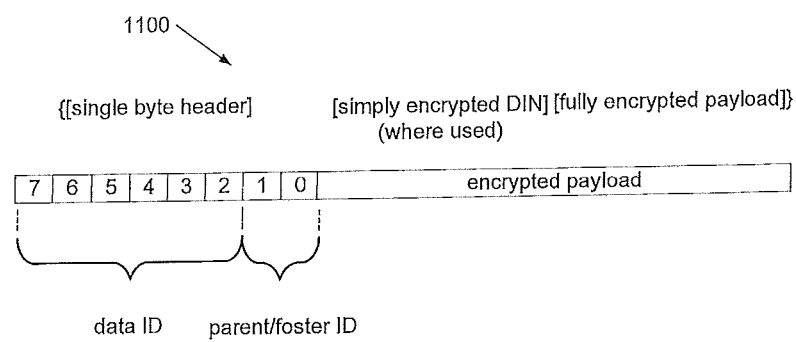
FIG. 11 is an example data format for message transmissions within and external to a local mesh network according to some embodiments.

The data envelope for the DDA consists of 3 sections as indicated in FIG. 11:

| Single byte header | |
|---|---|
| Bit | Description |
| 0 | Foster data |
| 1 | Reserved |
| 7-2 | Data ID |

Device Identification Number

Payload

A special encryption key may be employed when a SU 215 is operating via a foster network. This key is made from a combination of a ZigBee network key and the MAC address of the parent MCU 210. This ensures that the foster network cannot decrypt the data. When the foster data arrives at the listener services 256, the listener services 256 identifies the data to be for a different network and will use the MAC address of the parent network to decrypt the data. The listener services 256 can access database services 250 to retrieve the MAC addresses of all MCUs 210 in the system 100. The MAC address of MCU 210 is sent to the listener services 256 when the mesh network 120 is created for the first time. The MAC address is unique to every MCU 210.

The foster data also includes a device identification number (DIN) as part of its payload. The DIN is encrypted only with the network key. The server uses the DIN to retrieve the MAC address of the parent MCU 210 from database services 250 to decrypt the payload.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An interface device for scheduling efficient power allocation to a plurality of power control devices for a localized mesh network, the device comprising:
a local area wireless transceiver;
a memory storing
processor-executable program code,
at least one function type representing a type of a function that is a power-consuming activity of at least one appliance,
at least one function priority associated with the function type,
at least one task representing a subtype of the at least one function type, and
at least one task priority associated with the at least one task; and
at least one processor having access to the program code and configured to communicate with the plurality of power control devices via the local area wireless transceiver,
wherein, when the at least one processor executes the program code, the device is configured to:
receive a plurality of power allocation requests via the local area wireless transceiver from the plurality of power control devices forming part of the localized mesh network, each of the power allocation requests relating to proposed power usage by an appliance to which the respective power control device is coupled, each of the power allocation requests specifying a function type of the at least one function type and a task of the at least one task,
determine available power resources,
determine which of the power allocation requests to accommodate based on the available power resources, a priority level of the request, and an estimate of required power associated with the request, the priority level being determined by the at least one function priority and the at least one task priority associated with the request, and
respond to each of the power allocation requests to be accommodated by sending an approval message to each of the power control devices from which the accommodated power allocation requests were received indicating a time interval, at or during which the requested power will be allocated, the approval message comprising a resource allocation token defining a validity period corresponding to the time interval during which the respective power allocation request is considered valid to authorize performance of the function of the at least one appliance,
wherein any appliance of the at least one appliance manually activated by a user is immediately granted power, regardless of the priority level of the function and the task for which the appliance is manually activated.

2. The interface device of claim 1, wherein the power control device is co-located with the appliance.

3. The interface device of claim 1, wherein the power control device is integrated into the appliance.

4. The interface device of claim 1, wherein each of the plurality of power control devices is coupled with a power usage monitor configured to collect power consumption information relating to the appliance with which the respective power control device is associated, and
wherein the power control device is configured to output the power consumption information as part of the power allocation request.

5. The interface device of claim 1, wherein the interface device is configured for use with a power-generating facility such that the available power resources are determined by reference to a quantity of generated power.

6. The interface device of claim 1, wherein the plurality of power control units are configured to perform critical control functions in an event of failure of the interface device.

7. The interface device of claim 6, wherein control and predictive parameters are cached within the plurality of power control units.

8. A method for scheduling efficient power allocation to a plurality of power control devices in a localized mesh network using an interface device having a local area wireless transceiver, the method comprising:
receiving a plurality of power allocation requests, each of the power allocation requests comprising at least a function and a task, the power allocation requests being received via the local area wireless transceiver from the plurality of power control devices forming part of the localized mesh network, each of the power allocation requests relating to proposed power usage by an appliance to which the respective power control device is coupled;
determining available power resources;
determining which of the power allocation requests to accommodate based on the available power resources, a priority level of the request, and an estimate of required power associated with the request, the priority level being determined by a function priority and a task priority corresponding to the function and the task associated with the request; and
responding to each of the power allocation requests to be accommodated by sending an approval message to the power control devices from which the accommodated power allocation requests were received, indicating a time interval, at or during which the requested power will be allocated, the approval message comprising a resource allocation token defining a validity period corresponding to the time interval during which the respective power allocation request is considered valid to authorize performance of the function of the at least one appliance,
wherein any appliance manually activated by a user is immediately granted power, regardless of the priority level of the function and the task for which the appliance is manually activated.

* * * * *